United States Patent
Kalevo et al.

(10) Patent No.: US 9,503,782 B2
(45) Date of Patent: Nov. 22, 2016

(54) DECODER AND METHOD FOR DECODING ENCODED INPUT DATA CONTAINING A PLURALITY OF BLOCKS OR PACKETS

(76) Inventors: Ossi Kalevo, Toijala (FI); Tuomas Kärkkäinen, Turku (FI)

(*) Notice: Subject to any disclaimer, the term of this patent is extended or adjusted under 35 U.S.C. 154(b) by 605 days.

(21) Appl. No.: 13/584,047

(22) Filed: Aug. 13, 2012

(65) Prior Publication Data

US 2014/0044191 A1 Feb. 13, 2014

(30) Foreign Application Priority Data

Aug. 13, 2012 (GB) .................. 1214400.2

(51) Int. Cl.
*H04N 11/02* (2006.01)
*H04N 21/4402* (2011.01)
(Continued)

(52) U.S. Cl.
CPC .......... *H04N 21/4402* (2013.01); *H04N 19/12* (2014.11); *H04N 19/157* (2014.11);
(Continued)

(58) Field of Classification Search
CPC .................. H04N 19/12; H04N 19/157; H04N 19/188; H04N 19/46; H04N 21/4394; H04N 21/44008; H04N 21/4402
(Continued)

(56) References Cited

U.S. PATENT DOCUMENTS 5,526,054 A 6/1996 Greenfield et al.
5,832,130 A 11/1998 Kim
(Continued)

FOREIGN PATENT DOCUMENTS

EP 1370087 A1 12/2003
EP 1 771 007 A2 4/2007
(Continued)

OTHER PUBLICATIONS

Notification of Ground of Rejection, dated Jul. 2, 2014, issued by Japanese Patent Office in a related Japanese Patent Application No. 2013-165759 and its partial English translation of relevant portions (16 pages).
Search Report under Section 17 dated Oct. 25, 2012 issued by the U.K. Patent Office in related U.K. Application No. GB 1214400.2 (5 pages).
(Continued)

*Primary Examiner* — Gims Philippe
*Assistant Examiner* — Nathnael Aynalem
(74) *Attorney, Agent, or Firm* — Robert P. Michal, Esq.; Carter, DeLuca, Farrell & Schmidt, LLP

(57) ABSTRACT

A decoder which decodes input data to generate corresponding decoded output data is operable:
(a) to process encoded input data to extract header information indicative of encoded data pertaining to blocks and/or packets included in the encoded input data, the header information including data indicative of transformations employed to encode and compress original block and/or packet data for inclusion as the encoded data pertaining to the blocks and/or packets;
(b) to prepare a data field in a data storage arrangement for receiving decoded block and/or packet content;
(c) to retrieve information describing the transformations and then applying an inverse of the transformations for decoding the encoded and compressed original block and/or packet data to generate corresponding decoded block and/or packet content for populating the data field; and
(d) when the encoded input data has been at least partially decoded, to output data from the data field as the decoded output data.

23 Claims, 7 Drawing Sheets

(51) Int. Cl.

| | | |
|---|---|---|
| *H04N 21/439* | (2011.01) | |
| *H04N 21/44* | (2011.01) | |
| *H04N 19/46* | (2014.01) | |
| *H04N 19/12* | (2014.01) | |
| *H04N 19/157* | (2014.01) | |
| *H04N 19/169* | (2014.01) | |

(52) U.S. Cl.
CPC ............ *H04N 19/188* (2014.11); *H04N 19/46* (2014.11); *H04N 21/4394* (2013.01); *H04N 21/44008* (2013.01)

(58) Field of Classification Search
USPC .......................... 375/240.01–240.29; 382/223
See application file for complete search history.

(56) References Cited

U.S. PATENT DOCUMENTS

| | | | | |
|---|---|---|---|---|
| 6,614,939 | B1* | 9/2003 | Yamauchi | G06T 9/40 375/E7.091 |
| 7,379,496 | B2 | 5/2008 | Holcomb et al. | |
| 7,676,101 | B2 | 3/2010 | Sato et al. | |
| 8,406,299 | B2* | 3/2013 | Karczewicz | 375/240.15 |
| 8,576,097 | B2* | 11/2013 | Ugur | H04N 19/13 341/107 |
| 2002/0106019 | A1* | 8/2002 | Chaddha | H04N 19/51 375/240.02 |
| 2004/0125204 | A1* | 7/2004 | Yamada et al. | 348/97 |
| 2005/0163214 | A1 | 7/2005 | Yachida | |
| 2006/0013235 | A1 | 1/2006 | Farnham | |
| 2006/0204115 | A1* | 9/2006 | Burazerovic | 382/239 |
| 2008/0159401 | A1* | 7/2008 | Lee et al. | 375/240.16 |
| 2008/0304569 | A1* | 12/2008 | Lee et al. | 375/240.16 |
| 2011/0283168 | A1 | 11/2011 | Chen | |
| 2011/0293002 | A1* | 12/2011 | Sole et al. | 375/240.12 |
| 2012/0201300 | A1* | 8/2012 | Kim | H04N 19/105 375/240.12 |

FOREIGN PATENT DOCUMENTS

| | | | |
|---|---|---|---|
| EP | 1 814 077 A2 | 8/2007 | |
| EP | 1 814 077 A2 | 8/2012 | |
| GB | 2505169 B | 3/2016 | |
| JP | 2000333178 A | 11/2000 | |
| JP | 2006-074728 A | 3/2006 | |
| JP | 2007-243427 A | 9/2007 | |
| KR | 20020028200 A | 4/2002 | |
| KR | 20070048985 A | 5/2007 | |
| KR | 10-2011-0028734 | 3/2011 | |
| KR | WO 2011031044 A3 * | 6/2011 | ........... H04N 19/105 |
| TW | I364990 B | 5/2012 | |
| WO | WO 2006/054231 A1 | 5/2006 | |
| WO | WO 2010/039822 A2 | 4/2010 | |
| WO | WO-2011/031044 A2 | 3/2011 | |

OTHER PUBLICATIONS

Examination Report under Section 18(3), dated Nov. 18, 2013, issued by the United Kingdom Intellectual Property Office in a corresponding UK Patent Application No. GB1214400.2 (2 pages).

Vaisey et al., "Image Compression with Variable Block Size Segmentation," IEEE Transactions on Signal Processing, vol. 40, No. 8, Aug. 1992 pp. 2040-2060, XP000309977.

Winken et al., "Description of video codding technology proposal by Fraunhofer HHI," Joint Collaborative Team on Video Coding (JCT-VC) of ISO/IEC MPEG & ITU-T VCEG (ISO/IEC JTC1/SC29/WG11 and ITU-T SG16 Q6), Document No. JCTVC-A116, Apr. 15, 2010 pp. 1-44 XP002607630.

Egger et al., "High-performance compression of visual information—a Tutorial Review part I: Still Picture," Proceedings of the IEEE, vol. 87, No. 6, New York, U.S.A., Jun. 1999 pp. 976-1013 XP002148000.

Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, SE, Jul. 11-20, 2012, XP030112947 (288 pages).

Digital Accelerator Corp., "Region-based Image Coding System (RICS) with Dynamic Streaming of Code Blocks," JPEG 2000 Committee, Joint Photographic Expert Group Conference, Feb. 15, 1999 (96 pages).

Extended European Search Report, dated Jun. 2, 2014, issued by the European Patent Office in a corresponding European Patent Application No. 13002520.8 (9 pages).

Office Action, dated Feb. 4, 2015, issued by the Russian Patent Office in a corresponding RU Patent Application No. 2013137371/08 and its partial English translation of relevant portions (5 pages).

Examination Report under Section 18(3), dated Mar. 9, 2015, issued by the United Kingdom Intellectual Property Office in a corresponding UK Patent Application No. GB1214400.2 (3 pages).

Notification of Ground of Rejection, dated Apr. 1, 2015, issued by the Japanese Patent Office in JP Patent Application No. 2013-165759 and its partial English translation of relevant portions (12 pages).

Taiwan Office Action, Application No. 102128926 dated Jun. 30, 2015 and English translation (16 pages).

Decision of Rejection issued by the Japanese Patent Office corresponding to JP Patent Application No. 2013-165759 dated Apr. 5, 2016 (6 pages).

Certificate of Grant of Patent issued by the Intellectual Property Office in relation to Patent No. GB250169 dated Mar. 16, 2016 (1 page).

Taiwanese Office Action issued by the Taiwan Patent Office in relation to Taiwanese Patent Application No. 102128926 dated Jul. 4, 2016 (4 pages).

English Translation of Office Action issued Jul. 4, 2016 in Taiwan Patent Application No. 102128926 dated Jul. 29, 2016 (2 pages).

* cited by examiner

DECODER AND METHOD FOR DECODING ENCODED INPUT DATA CONTAINING A PLURALITY OF BLOCKS OR PACKETS

CROSS REFERENCE TO RELATED APPLICATION

This application claims priority from U.K. Application Serial No. GB 1214400.2 filed Aug. 13, 2012, the entire contents of which is incorporated herein by reference.

FIELD OF THE INVENTION

The present invention relates to decoders for receiving encoded input data and decoding the input data to generate corresponding decoded output data. Moreover, the present invention also concerns methods of decoding encoded input data to generate corresponding decoded output data. Furthermore, the present invention also concerns software products recorded on machine-readable data storage media, wherein the software products are executable upon computing hardware for implementing aforesaid methods.

BACKGROUND OF THE INVENTION

Images and videos are stored and communicated to an increasing extent by contemporary human population, for example multimedia content via Internet and wireless communication networks. The images and videos are stored and communicated between devices, software applications, media systems and data services. During such storage and communication, images and video are captured scanned, transmitted, shared, watched and printed. However, such images and videos are demanding in respect of data memory capacity and communication system bandwidth utilized. When communication system bandwidth is limited, such images and videos take significant time to communicate. For addressing such storage requirements, it has been customary practice to employ image and video encoding methods which also provide a degree of data compression. Some contemporary encoding standards for images and video are provided in Table 1.

TABLE 1 contemporary encoding standards

| JPEG | MPEG-1 | H.261 | WebP | Lucid |
|---|---|---|---|---|
| JPEG2000 | MPEG-2 | H.263 | WebM | GIF |
| JPEG XR | MPEG-4 | H.264 | | PNG |
| | MPEG-4 AVC | | | TIFF |
| | MPEG-4 MVC | | | BMP |
| | MP3 | | | VC-1 |
| | | | | Theora |
| | | | | AAC |
| | | | | FLAC |
| | | | | Ogg Vorbis |
| | | | | Speex |

Image and audio files are becoming larger as image quality is progressively improved, for example by adoption of high definition (HD) standards and high dynamic range (HDR). However, 3-dimensional (3-D) images, videos and audio are gaining increasing popularity which demands correspondingly more efficient encoding and decoding methods in encoders and decoders, namely "codecs", to cope with associated increased quantities of data to be communicated and stored. However, it is highly desirable that encoding methods that provide a degree of data compression should be substantially lossless in relation to information content when generating the compressed data.

Conventional codecs are described in earlier published patent applications and granted patents, for example as in US5832130, US7379496 and US7676101. In general, known video codecs are not able to code efficiently extensive areas of images with substantially constant parameters whilst concurrently being able to encode highly spatially detailed areas of the images. It is customary practice to employ motion compensation in a form of prediction and prediction error coding methods based upon use of transformations, for example discrete cosine transform (DCT) and wavelet transformations. These transformations employ a process wherein portions of a given image, for example a still image or an image forming a part of a video sequence, are divided into blocks which are then subject to encoding processes. The blocks are, for example, 8×8 image elements, 4×4 image elements or similar. Such relatively smaller blocks are employed because larger sizes of blocks result in inefficient encoding processes, although 16×16 image element blocks are sometimes employed. According to contemporary known approaches to image encoding, when multiple different block sizes are used for encoding, it is customary practice to utilize a small variation in block sizes; moreover, block sizes are selected based upon how well movement can be compensated in an associated block area or based upon a encoding quality parameter, for example a target quality parameter. In general, higher encoded image quality requires smaller blocks which results in less data compression. Certain types of contemporary encoding can even results in an increase in data size, when error correction features such as parity codes and error correction codes are included.

From the foregoing, it will be appreciated that providing data compression of images and videos whilst preserving image quality is a contemporary problem which is not adequately addressed by known encoders and decoders, despite a large variety of codecs having been developed during recent decades.

SUMMARY OF THE INVENTION

The present invention seeks to provide a decoder for decoding encoding input data representative of at least one image and generating corresponding decoded output data representative of the at least one image, wherein the decoded output data is decompressed in relation to the encoded input data without any substantial loss of image quality occurring during decoding.

The present invention also seeks to provide a method of decoding encoding input data representative of at least one image and generating corresponding decoded output data representative of the at least one image, wherein the decoded output data is decompressed in relation to the encoded input data without any substantial loss of image quality occurring during decoding.

According to a first aspect of the present invention, there is provided a method of decoding encoding input data as claimed in appended claim 1: there is provided a method of decoding encoded input data to generate corresponding decoded output data, characterized in that the method includes steps of:
(a) processing the encoded input data to extract therefrom header information indicative of encoded data pertaining to blocks and/or packets included in the encoded input data, the header information including data indicative of one or more transformations employed to encode and compress original block and/or packet data for inclusion as the encoded data pertaining to the blocks and/or packets;

(b) preparing a data field in a data storage arrangement for receiving decoded block and/or packet content;

(c) retrieving information describing the one or more transformations and then applying an inverse of the one or more transformations for decoding the encoded and compressed original block and/or packet data to generate corresponding decoded block and/or packet content for populating the data field; and (d) when the encoded input data has been at least partially decoded, outputting data from the data field as the decoded output data.

The invention is of advantage in that the method enables encoded input data to be decoded and decompressed in an efficient manner, without substantially loss of quality of content present in the encoded input data.

Optionally, the method includes splitting blocks and/or packets in the data field according to splitting information included in the encoded input data.

Optionally, the method includes decoding blocks and/or packets corresponding to a temporal series of images, wherein sub-division of the blocks of a given image in the series is dependent upon content present in one or more images preceding the given image within the temporal sequence of images.

Optionally, step (c) of the method includes fetching supplementary information from a database arrangement for use when executing the inverse of one or more transformations, the supplementary information including at least one of: algorithms, rules, one or more transformation parameters. More optionally, the method further includes retrieving header information from the encoded input data indicative of the database arrangement for enabling decoding of the encoded input data to access the supplementary information used when earlier encoding the input data.

Optionally, the method includes employing for the inverse of the one or more transformations inverses of one of more of: data base reference, DC-value, DCT, pulse code modulation (PCM), DPCM, RLE, LZO, VLC, Huffman-coding, arithmetic coding, transform coding, delta coding, bzip2-specific RLE.

Optionally, the method includes decoding at least one of video and audio information present in the encoded input data.

According to a second aspect of the invention, there is provided a software product recorded on machine-readable data storage media, characterized in that the software product is executable upon computing hardware for executing a method pursuant to the first aspect of the invention.

According to a third aspect of the invention, there is provided a software application for a mobile wireless communication device, characterized in that the software application includes a software product pursuant to the second aspect of the invention.

According to a fourth aspect of the invention, there is provided a decoder operable to decode encoded input data to generate corresponding decoded output data, characterized in that the decoder includes data processing hardware which is operable:

(a) to process the encoded input data to extract therefrom header information indicative of encoded data pertaining to blocks and/or packets included in the encoded input data, the header information including data indicative of one or more transformations employed to encode and compress original block and/or packet data for inclusion as the encoded data pertaining to the blocks and/or packets;

(b) to prepare a data field in a data storage arrangement for receiving decoded block and/or packet content;

(c) to retrieve information describing the one or more transformations and then applying an inverse of the one or more transformation for decoding the encoded and compressed original block and/or packet data to generate corresponding decoded block and/or packet content for populating the data field; and (d) when the encoded input data has been at least partially decoded, to output data from the data field as the decoded output data.

Optionally, the decoder is implemented such that the data processing hardware is implemented using computing hardware operable to execute a software product.

Optionally, the decoder is operable to use an inverse of the one or more transformations to decompress content associated with the blocks and/or packets, so that the decoded output data is larger in size than the encoded input data to be decoded.

Optionally, the decoder is implemented such that the blocks and/or packets are sub-divided so that at least one of their representative parameters describing their content is substantially flat within their sub-divided blocks and/or packets. More optionally, when the decoder is in operation, the at least one parameter corresponds to a colour of the sub-divided blocks.

Optionally, the decoder is implemented such that the blocks and/or packets correspond to a series of images, wherein sub-division of the input data corresponding to a given image to form the plurality of corresponding blocks is dependent upon content present in one or more images preceding the given image within the temporal sequence of images.

Optionally, the decoder is operable to retrieve header information to the transformed data to generate the decoded output data, wherein the header information includes information indicative of the one or more transformations employed by an encoder which generated the encoded input data.

Optionally, the decoder is operable to fetch supplementary information from a database arrangement for use when executing the inverse of one or more transformations, the supplementary information including at least one of: algorithms, rules, one or more transformation parameters. More optionally, the decoder is operable to retrieve header information from the encoded input data in a manner indicative of the database arrangement for enabling decoding of the encoded input data to access the supplementary information used when earlier encoding or decoding the encoded input data.

Optionally, the decoder is operable to employ for the inverse of one or more transformations inverses of one of more of: data base reference, DC-value, DCT, pulse code modulation (PCM), DPCM, RLE, LZO, VLC, Huffman-coding, arithmetic coding, transform coding, delta coding, bzip2-specific RLE.

Optionally, the decoder is operable to decode at least one of video and audio information present in the encoded input data.

According to a fifth aspect of the invention, there is provided an electronic consumer product operable to receive and/or store input data, characterized in that the electronic consumer product includes a decoder pursuant to the fourth aspect of the invention for decoding the input data for generating decoded content for providing to at least one user of the consumer product.

Optionally, the electronic consumer product is at least one of: a mobile telephone, a cell phone, a tablet computer, a television, a portable media playing device, a camera, a personal computer.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein:

FIG. 1 is a schematic illustration of an embodiment of a decoder pursuant to the present invention;

FIG. 2 is a flow chart of steps of a method of decoding encoding input data representative of at least one image and/or audio to generate corresponding decoded output data, wherein the decoded output data is decompressed relative to the encoded input data without substantial loss of image and/or audio quality occurring during decoding; and FIG. 3 is an example partitioning of an image into areas corresponding to blocks for decoding using a method whose steps are illustrated in FIG. 2;

Figure 1:
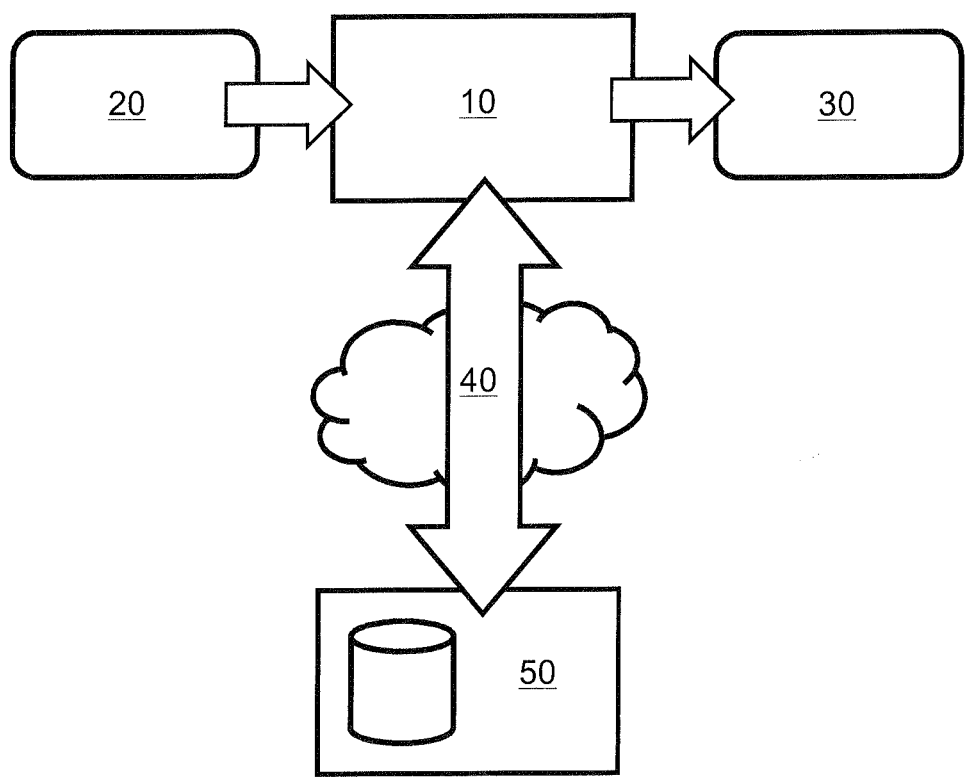

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In overview, the present invention is concerned with decoders and associated methods of decoding encoding input data to generate corresponding decoded output data. The method is concerned with receiving encoded input data representative of one or more images and/or one or more audio signals, and then processing the encoded input data by executing steps of:

(i) interpreting header information included in the encoded input data;
(ii) identifying block and/or packet information present within the encoded input data;
(iii) populating a data field with blocks and/or packets corresponding to the identified block or packet information;
(iv) identifying one or more transformations which have been used to generate the block and/or packet information; and
(v) applying an inverse of the identified one or more transformations to decode the block and/or packet information to generate decoded data to populate the data field with decoded block or packet information, thereby providing the aforesaid decoded output data.

Optionally, after having executed the step (iii), if it is found in the input encoded data that a given block or packet has been split, the populated blocks or packets in the data field are correspondingly split; such a feature enables the data field to be configured with an arbitrary template of blocks or packets which are subsequently amended, for example appropriately split, during decoding of the encoded input data.

During earlier encoding to generate the encoded input data by utilizing an encoding method implemented in an encoder, a selection of the blocks is determined by an ease with which areas corresponding to the blocks can be encoded; for example, larger blocks are employed for areas of the one or more images which have a substantially constant associated parameter value, namely are "flat, and smaller blocks are employed for areas of the one or more images which are difficult to encode on account of relatively abrupt spatial changes in associated parameter values for the areas. The parameters optionally pertain to one or more of: colour, illumination, sliding parameter value, repetitive pattern. Easy encoding corresponds, for example, to at least one parameter associated with a given area being substantially constant within the given area, for example substantially constant given colour within the given area. Moreover, the encoding method also employs larger blocks for stationary areas in video sequences of images, or to groups of areas in the video sequences of images that are moving similarly, namely blocks which correspond to fixed objects. The blocks are optionally rectilinear in relation to areas of the one or more images which they represent, for example 64×64 elements, 32×16 elements, 4×20 elements, 10×4 elements, 1×4 elements, 3×1 elements, 8×8 elements, 1×1 element and so forth; optionally, the elements correspond to pixels present in the one or more images, but can be subject to scaling operations during encoding, namely each element corresponding to a corresponding plurality of pixels. However, other shapes of blocks are optionally employed, for example elliptical blocks, circular blocks and so forth. Moreover, by analogy, the encoding method can also be applied to encode one or more audio signals, wherein the one or more audio signals are subdivided into packets of variable temporal length, depending upon a nature of the audio signals corresponding thereto, and the packets are then encoded to generate encoded compressed output data; the packets are synonymous with aforesaid blocks but pertain to audio rather than image information. The encoding method is capable of concurrently encoding both audio information and image information, for example as in multimedia content.

During processing of the areas of the one or more images into corresponding blocks, the encoding method includes checking a quality of representation of information provided by the blocks relative to corresponding detail in the one or more images to compute a corresponding quality index; in an event that the computed quality index indicates, when compared against a reference quality threshold, that a selection of block sizes has been employed such that the quality of representation of data provided by the blocks is insufficient, the encoding method iterates back and uses progressively smaller blocks until the quality index indicates that the quality of representation is met as defined by the reference quality threshold. By such an approach, it is feasible to achieve data compression during encoding which is substantially lossless, depending upon choice of threshold value for the quality of representation of information. Optionally, the reference quality threshold is made dynamically variable, depending upon content present in the one or more images; for example, when the one or more images are a part of video sequence where there is rapid chaotic activity, the reference quality threshold can be relaxed during the chaotic activity for enabling an enhanced degree of data compression to be achieved. The chaotic activity can be, for example, random features such as flowing turbulent water, flames, falling snow, billowing smoke, ocean waves and so forth, wherein loss of information is not readily discernible when the encoded data is subsequently decoded in a decoder.

Determination of blocks in the aforesaid encoder can be optionally based upon one or more criteria as listed in Table 2.

TABLE 2

Split selection of blocks during image encoding

| Criterion number | Criterion |
| --- | --- |
| 1 | Variance or standard deviation of block data as derived from a corresponding area of an input image |
| 2 | Mean or sum of an absolute difference between data represented by a given block and a prediction of its value |
| 3 | Variance or standard deviation of an absolute difference between data represented by a given block and a prediction of its value |

Optionally, predictions in Table 2 are based upon known rules employed when encoding one or more images. Alternatively, the predictions in Table 2 are based upon provided configuration information, for example as provided from selected database references, from prediction directions, from movements of block coordinates within the one or more images, and so forth. A use of a variance or a standard deviation is an approach employed to provide compression of information by describing a mutual relationship of elements included within a given corresponding block. In many situations, predictions of block data with associated encoding is itself sufficient when performing encoding, but it is optionally desirable to include code prediction error data within the prediction to improve an accuracy of the prediction. In a simple example of encoding, a simple data prediction method is employed, for example a mean value, namely "DC" value, of pixels or elements within a given block to be delivered in the encoded output data.

Splitting areas of one or more images provided as input data to an encoder implementing the aforesaid method is optionally implemented according to any manner which provides both compression and also substantially maintains image quality, namely is substantially lossless during encoding. The encoding method applies various strategies to such splitting of areas. For example, if a given block includes considerable information, it is optionally split into a plurality of corresponding smaller blocks that are relatively "flat", namely substantially constant, in relation to their content such that they individually include relatively little information. When the encoding method is applied to at least one or more images and/or one or more audio signals, encoding quality and encoding noise in the encoded output data are optionally employed to control a manner in which splitting up of input images and audio input signals into blocks and packets respectively occurs. Optionally, the noise in the encoded output encoded data is based on at least one of:
(i) noise present in a present block or packet;
(ii) noise present in one or more previous blocks or packets generated by the method; and
(iii) previous images.

Optionally, when a given input image is split into areas and corresponding blocks, the encoding method analyses the blocks thereby generated to determine whether or not any of the blocks can be combined together, subject to aforesaid quality criteria, in order to obtain a greater degree of data compression in the encoded output data. In the foregoing, the encoded output data includes information associated with the blocks which defines locations of their corresponding areas in their original images in the input data to be encoded.

When encoding the one or more images present in the input data to be encoded using the method, data associated with the input images is beneficially down-sampled, for example down-sampled in ratios of 2×1:1, 2×2:1, 1×2:1, 4×1:1, or similarly quantized prior to being subject to aforementioned encoding methods. Optionally, such down-sampling is performed in response to a desired quality of encoding desired in the compressed encoded output data generated from applying encoding methods.

Optionally, larger blocks processed by the encoding method are less quantized than smaller blocks; in other words, a degree of quantization employed is optionally decreased as block sizes are increased. Optionally, during encoding, a scaling factor for down-sampling employed, is made dynamically variable, for example in response to a nature of content in a sequence of images, for example video, to be encoded.

During encoding of blocks pursuant to the encoding method, each block has various parameters which describe its contents. These parameters are conveyed when encoding via various "channels". For example, colour channels describing blocks of an image can include one or more of: black/white (B/W), Y, U, V, red (R), green (G), blue (B), Cyan (C), Magenta (M), Y and K. Moreover, the input images for encoding and the blocks can be optionally processed when executing the encoding method using a variety of potential colour or pixels formats, for example Y, YUV420, YUV422, YUV444, RGB444, G and CMYK contemporary standards and formats. Moreover, the format is optionally planar, interleaved, line planar and so forth. Moreover, the encoding method is beneficially operable to change format of images and/or blocks when performing encoding activities; for example, an original image is in an interleaved RGB format and is encoded using methods of encoding to generate encoded output data in YUV420 format or vice versa.

Bit depth, namely dynamic range of a pixel when implementing the aforesaid encoding method, is beneficially in a range of 1-bit to 64-bit resolution. Optionally, different pixel colours or audio channels can be encoding with mutually different resolutions, provided that encoding quality criteria and compression performance of the encoding methods is satisfied.

The encoding methods are optionally implemented using encoding parameters and encoding rules and/or tables which are stored on a database and which are accessed when performing encoding activities. Optionally, the database is creating during the encoding process and delivered for use when implementing the method via an encoder. For example, motion compensation during encoding us beneficially implemented using delivered databases of information to the encoder. Beneficially, the encoder is operable to encode original pixel information present in the input data and/or encode prediction error information. Using database information when encoding input data to generate corresponding encoded output data enables the encoder to adapt to revisions in encoding standards of parameters, tables and similar utilized for encoding. Coding approaches which can be adopted when implementing the encoding methods optionally include one or more of: data base reference, DC-value, DCT, pulse code modulation (PCM), DPCM, RLE, LZO, VLC, Huffman-coding, arithmetic coding, transform coding, delta coding, bzip2-specific RLE. Optionally, the coding approaches including any combination of aforementioned examples of coding. When a coding approach such as Huffman encoding is employed, such coding beneficially uses fixed tables of encoding parameters or delivered tables of coding parameters. The encoder is beneficially implemented using computing hardware having data storage arrangements, wherein optimized tables of encoding parameters can be stored in the data storage arrangements for future use when performing encoding operations. Beneficially, reference addresses for enabling a decoder to access databases for obtaining suitable parameters for decoding the encoded output data from the encoder are included in the encoded output data. Optionally, the databases are accessible via a communication network, for example via Internet. Optionally, the databases are supported via cloud computing arrangements. When the method implemented in the encoder utilizes mathematically generated databases, the databases can optionally be DC value, 1D/2D-linear transition, 1D/2D-curved transition, a 1D/2D transformation function or some known image block or audio packet structure.

The method of encoding when executed on an encoder is operable to encode input data to generate encoded output data, wherein the encoded output data can be output as a bit stream, alternatively stored in data storage media, for example as a data file. Moreover, the encoding method is capable of being utilized in a range of possible applications; beneficially, a header for video, image, image block, audio or audio packets beneficially includes supplementary information, such as version number, size of data for the video, image or packet, quality factor threshold employed when encoding, maximum block or packet size, encoding approaches applied, tables of encoding parameters, and any other information for assisting subsequent decoding processes. Optionally, information that does not vary between blocks is not included for obtaining an enhanced degree of data compression in the encoded output data, or is included at a higher level in the encoded output data, for example at header or sub-header level. Table 3 provides a hierarchical order of levels which are beneficially employed in the encoded output data generated by the encoder.

TABLE 3 order of levels in encoded output data, from high to low

| Level order | Information associated with level |
|---|---|
| High | Video |
| | groups of images |
| | Image |
| | groups of macro blocks |
| Medium | macro block |
| | groups of blocks |
| | Block |
| | groups of microblocks |
| Low | Microblock |

Optionally, the encoding method is operable when executed to select and to deliver information pertaining to one or more levels in the encoded output data, for example dependent upon field of application of the method, for example consumer video products, professional image compression apparatus for survey use, X-ray imaging apparatus, magnetic resonance imaging (MRA) apparatus. Similar considerations pertain to orders of levels in encoded output data when the encoding method is employed to encode audio data; there can be employed headers for audio, groups of packets, packets, sub-packets, groups of waveform segments, and waveform segment.

The encoded output data from the encoder are communicated and/or stored, and eventually are received as encoded input data to a decoder pursuant to the present invention. The decoder beneficially implements a method of decoding encoded input data pursuant to the present invention.

Referring to FIG. 1, there is shown an illustration of a decoder pursuant to the present invention. The decoder is denoted by 10 and is operable to receive encoded input data 20, for example encoded output data from the aforementioned encoder, and to decode the encoded input data 20 by employing a decoding method pursuant to the present invention to generate corresponding decoded decompressed output data 30. The output data 30 is beneficially decoded in a substantially lossless manner as aforementioned. Optionally, the decoder 10 is coupled via a communication network 40 to a database arrangement 50 whereat one or more parameters, tables and/or rules for decoding the encoded input data 20 are stored.

In operation, the decoder 10 receives the encoded input data 20, optionally derives decoding information from the database arrangement 50 via the communication network 40, and then proceeds to decode the encoded input data 20 to generate the decoded decompressed output data 30. Optionally, the encoded input data 20 includes at least one of: encoded audio, one or more encoded images, encoded video. Optionally, the encoded input data 20 includes headers, encoding information as well as encoded data. The encoded input data 20 can be streamed from an encoder, for example via a communication network arrangement, or retrieved from machine-readable data storage media, for example server hard drive disk storage, portable solid-state memory devices and so forth.

The decoder 10 is beneficially implemented as hardware, for example via PGLA, via one or more software application executable upon computing hardware, or any mixture of hardware and software. The decoder 10 can be employed in multimedia products, computers, mobile telephones ("cell phones"), Internet services, video recorders, video players, communication apparatus and similar. The decoder 10 is optionally employed in conjunction with image capture systems which output encoded data, for example surveillance cameras, hospital X-ray systems, hospital MRI scanners, hospital ultrasound scanners, aerial surveillance systems and similar apparatus which generate large quantities of image data wherein lossless compression is desired so as to preserve fine information in the images whilst rendering the quantities of image data manageable for data storage purposes.

The decoder 10 is beneficially useable with known apparatus for image processing, for example in conjunction with an image/video processor as described in a published US patent application no. US2007/280355 herewith incorporated by reference, for example in conjunction with an image generator as described in a published US patent application no. US2010/0322301 herewith incorporated by reference, and for example with a pattern recognizer as described in a published US patent application no. US2011/007971 herewith incorporated by reference.

Figure 2:
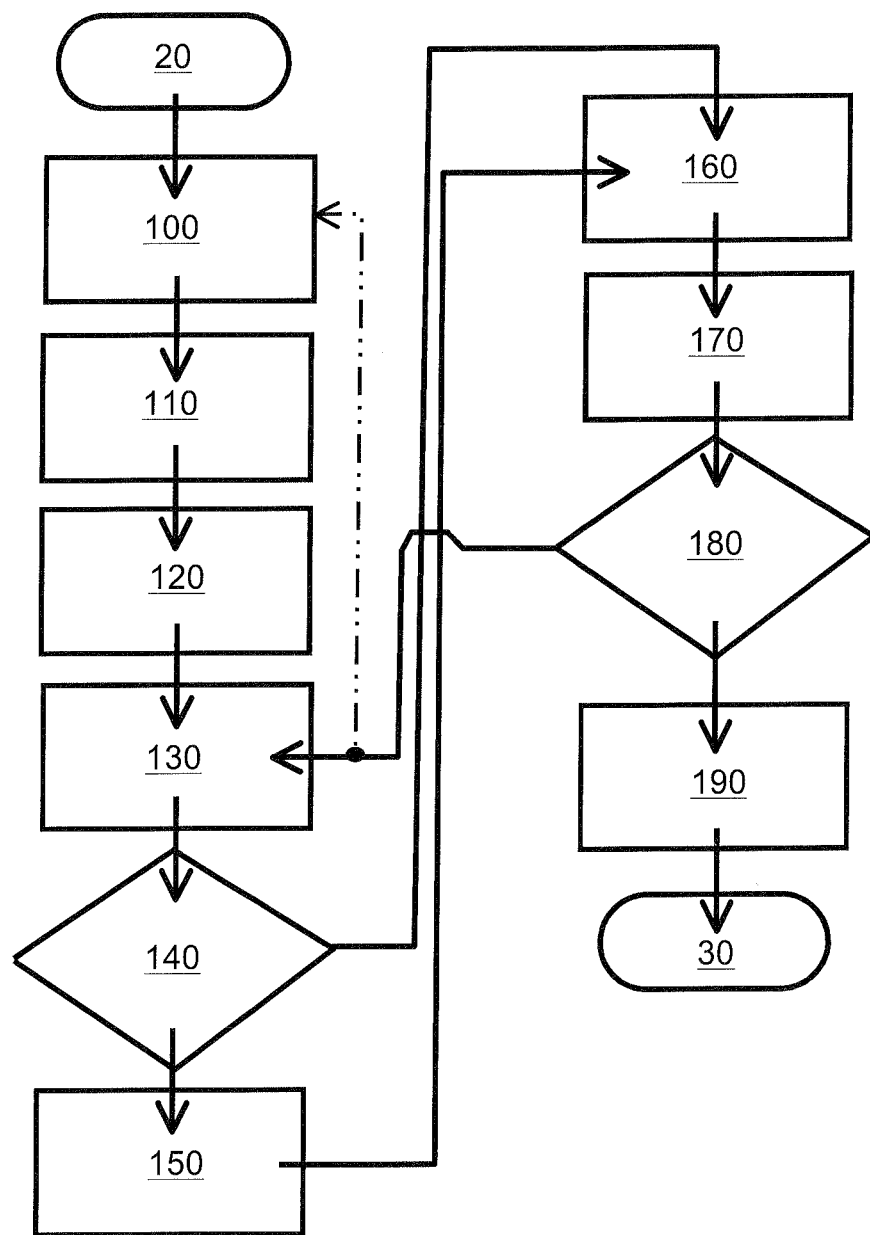

A method of decoding encoded input data using the decoder 10 of FIG. 1 will now be described with reference to FIG. 2. In FIG. 2, steps of a method of decoding encoded input data 20 are denoted by 100 to 190.

In a first step 100, the method of decoding includes receiving encoded input data for blocks, image, video and/or audio, for example for receiving the aforesaid encoded input data 20. In a second step 110, executed after the first step 100, the method includes finding and decoding header information present in the encoded input data 20, for example parameters describing image size, one or more compression transformations which have been employed when generating the encoded input data 20, for example RLE and/or Huffman algorithms.

In a third step 120, executed after the second step 110, the method optionally includes creating an initial set of blocks and/or packets for receiving decoded data from the second step 110. Thereafter, in a fourth step 130, the method includes analysing the decoded header data from the second step 110 to determine splits of blocks and/or packets, and optionally to combine information where appropriate, for example duplicating parameters which are arranged to describe content of a plurality of blocks and/or packets. In a fifth step 140 executed after the fourth step 130, the method includes determining whether or not a given block or packet is split; in an event that the given block or packet is not split, the method progresses to a seventh step 160; in an event that the given block or packet is split, the method progresses to a sixth step 150 which is concerned with splitting blocks or packets involving a creation of one or more new blocks or packets. Upon execution of the sixth step 150, the method progresses to a seventh step 160.

In the seventh step 160, the method includes processing block and/or packet information. In an eighth step 170, executed after completion of the seventh step 160, the method includes decoding encoded data corresponding to blocks or packets included in the encoded input data 20 by applying one or more inverse transformations whose identities are determined from the header information derived from the second step 110. Optionally, the one or more inverse transformations are obtained by the decoder 10 communicating via the communication network 40 with the database arrangement 50, for example a database arrangement 50 that provided transformation algorithm support for earlier encoding the encoded input data 20. During the eighth step 170, the blocks and/or packets generated in the third step 120, and optionally split in the fourth, fifth and sixth steps 130, 140, 150 respectively, are populated with decoded block and/or packet data generated in the eighth step 170, wherein the decoded block and/or packet data optionally becomes decompressed. In the aforesaid ninth step 180, the method includes checking for a last block, a last packet or an initial block or frame being reached; in an event that the last block and so forth is not reached, the method progresses back to the first step 100 or the fourth step 130; in an event that the last block and so forth is reached, the method includes progressing to a tenth step 190 wherein decoding of block, packet or image or video has been completed, whereafter the method includes outputting the decoded output data 30, namely a decoded and decompressed version of the encoded input data 20. It is also possible to jump directly from the second step 110 to the eight step 170, if the header information shows that the block or image is similar than the previous block or image or the block or image is e.g. black in colour. All the decoded data that can be shown, written to the file or streamed out is beneficially made as early as possible to avoid extra buffering and latencies.

Figure 3:
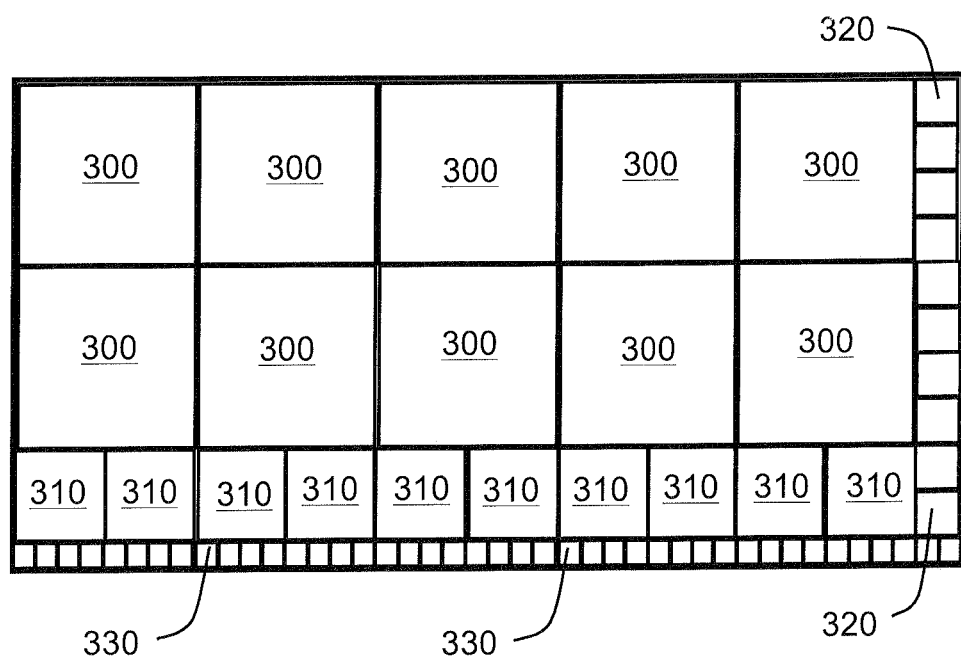

Referring next to FIG. 3, from the foregoing, it will be appreciated that the method of encoding employed to generate the encoded input data 20, when appropriate, generates a variable block or packet size for providing an optimal solution between data compression in the encoded input data 20 and substantially lossless compression, namely substantially without discernible loss. In FIG. 3, large coding blocks 300 are employed for an upper left hand corner of a given image, whereas smaller blocks 310, 320, 330 are required along right-hand-side and lower edge areas of the image for more accurately providing encoding of these areas. In the encoded input data 20, parameters describing image content of the blocks 300, 310, 320, 330 and the position of the blocks within the image are included in the encoded input data 20. The distribution of the blocks 300, 310, 320, 330 will vary depending upon spatial distribution of content within images to be encoded. The decoder 10 is operable, for example, to cope with decoding encoded data from a scheme as depicted in FIG. 3. Optionally, the computing hardware of the encoder 10 is implemented as a plurality of data processors which are capable of operating in a concurrent manner to decode encoded data corresponding the blocks and/or packets, thereby increasing a rate at which the encoded input data 20 can be decoded to generate the decoded output data 30; for example real-time decoding of video streams thereby becomes feasible. A FIG. 3 shows example of the initial split of blocks in the image that is generated in the third step 120 of decoder (second step 110 in encoder). This initial split of blocks does not require any information to be sent between encoder and decoder, because it can be based e.g. size of the image, When the real split of block is done in the fifth step 140 in encoder then that information is needed to be delivered from the encoder to the decoder. Decoder decodes this delivered information in the fourth step 130 and does splitting of blocks or packets decision in the fifth step 140 based on that decoded information.

In the foregoing, the following abbreviations have been used as given in Table 4. These various encoding formats are all potentially relevant for use when implementing the decoder 10, depending upon desired performance of the decoder 10.

TABLE 4

Abbreviations for decoding transformations useable when implementing embodiments of the present invention

| | |
|---|---|
| 1D | 1-Dimensional (e.g. for a signal or packet) |
| 2D | 2-Dimensional (e.g. for a block, image, stereo or multichannel audio) |
| 3D | 3-Dimensional (e.g. for video, stereo image, multichannel image) |
| AAC | Advanced Audio Coding |
| AVC | Advanced Video Coding |
| BMP | Bitmap—file format |
| DC | Direct current |
| DCT | Discrete cosine transform |
| DPCM | Differential Pulse Code Modulation |
| FLAC | Free Lossless Audio Codec |
| GIF | Graphic Interchange Format |
| JPEG | Joint Photographic Experts Group |

TABLE 4-continued

Abbreviations for decoding transformations useable when
implementing embodiments of the present invention

| | |
|---|---|
| JPEG XR | JPEG eXtended Range |
| LZO | Lempel-Ziv transform based coding method |
| MAD | Mean Absolute Difference |
| MP3 | MPEG-1 Audio Layer 3 |
| MPEG | Motuion Picture Experts Group |
| MSD | Mean Square Difference |
| MVC | Multiview Video Encoding |
| PCM | Pulse Code Modulation |
| PNG | Portable Network Graphics |
| RLE | Run-Length Encoding |
| SAD | Sum of Absolute Differences |
| SSD | Sum of Squares Differences |
| TIFF | Tagged Image File Format |
| VLC | Variable Length Coding |
| VQ | Vector Quantization |

The method of decoding pursuant to the invention, for example as depicted in FIG. 2, is capable of, via layer and channel encoding executed in the decoder 10, supporting interactive video presentations for providing new types of content delivery services, for example interactive commercial advertisements, different viewing perspectives when streaming live sports activities such as Formula I and so forth, and movies. For example, the decoder 10 allows for movies with localized subtitle layers, interactive watermarks, interactive pattern recognition, animated 2D/3D user interface (UI) buttons and so forth.

AN EXAMPLE

Simplified example of decoding an encoded image is described. Based on embodiment decoder receives information content from encoder (for example as streamed or as file).

According to example the information content is in form of file consisting of following information fields and content:

---
Imagesize: 120 × 80 pixels
InitialBlocksize: 40 × 40 pixels
SplitBit: 0 0 1 0000 0 1 0010 0000 1 1000 0000
MethodBits: 0 0 1 0 0 0 0 0 0 0 0 0 0 0 0 0 0 0 0 0 0 0
Values: 10 10 20 25 15 20 10 10 10 10 10 10 5 10 5 5 5 5 5 10 5 5 5
---

Where:

Imagesize describes the size of the image to be decoded. The size of the image can be arbitrary;

InitialBlocksize describes what is size of "basic" initial blocks. Depending on the implementation the InitialBlocksize can be fixed (such as 40×40) or it can vary (20×20, 80×80 etc). It might not be needed to send Initialblocksize information in case using default values in decoder and encoder;

SplitBit values of "0" indicate that said block will not be split and value "1" indicates that said block will be split. In case of spitting the block to sub blocks "1" will be followed by rules on whether to split sub block or not;

Methodbits describe what to do with each block. As an example "0" can refer to filling block with uniform colour, "1" might refer to applying colour gradient to a block; and Values describe value to be applied to each Methodbit, value can be for example colour value or for example rules on filling gradients or for example pointer to database containing instructions on how to fill the block. In example value 10 corresponds to blue, value 5 to green and values 15, 20, 25 to different intensities of red.

Figure 4:
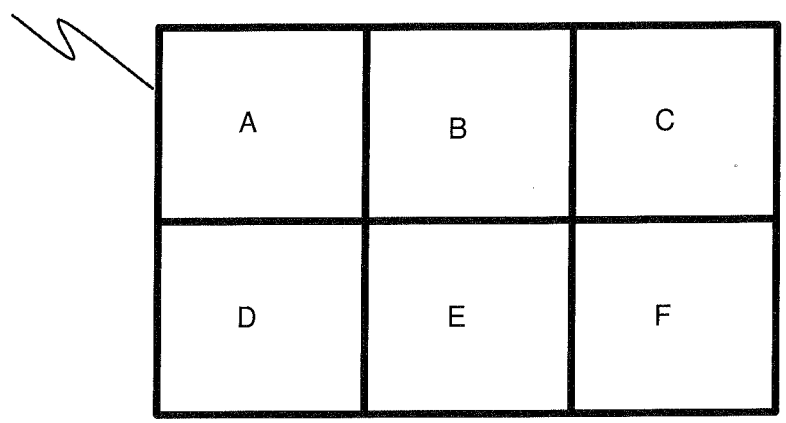
FIG. 4 is an example of initial partitioning an example image to be decoded using methods of embodiments.

In first step of decoding an image an image area of 120×80 pixels is reserved from memory of the device where decoding takes place. The image area 402 is split to six 40×40 blocks as shown in FIG. 4. Said blocks are marked with letters A, B, C, D, E and F for clarity purposes.

In second step of decoding the image Splitbit information content (0 0 1 0000 0 1 0010 0000 1 1000 0000) is used to split image area 402 to further blocks.

The bit number 1 of Splitbit information content is "0" indicating that the block A will not be split further.

The bit number 2 of Splitbit information content is "0" indicating that the block B will not be split further.

The bit number 3 of Splitbit information content is "1" indicating that the block C will be split to sub blocks.

The bit number 4 of Splitbit information content is "0" indicating that sub block 1 (later C1) of the block C will not be split further. The bit number 5 of Splitbit information content is "0" indicating that sub block 2 (later C2) of the block C will not be split further.

The bit number 6 of Splitbit information content is "0" indicating that sub block 3 (later C3) of the block C will not be split further. The bit number 7 of Splitbit information content is "0" indicating that sub block 4 (later C4) of the block C will not be split further.

The bit number 8 of Splitbit information content is "0" indicating that the block D will not be split further.

The bit number 9 of Splitbit information content is "1" indicating that the block E will be split to sub blocks.

The bit number 10 of Splitbit information content is "0" indicating that sub block 1 (later E1) of the block E will not be split further.

The bit number 11 of Splitbit information content is "0" indicating that sub block 2 (later E2) of the block E will not be split further.

The bit number 12 of Splitbit information content is "1" indicating that the sub block E3 will be split to sub blocks.

The bit number 13 of Splitbit information content is "0" indicating that sub block 1 (later E31) of the sub block E3 will not be split further.

The bit number 14 of Splitbit information content is "0" indicating that sub block 2 (later E32) of the sub block E3 will not be split further.

The bit number 15 of Splitbit information content is "0" indicating that sub block 3 (later E33) of the sub block E3 will not be split further.

The bit number 16 of Splitbit information content is "0" indicating that sub block 3 (later E34) of the sub block E3 will not be split further.

The bit number 17 of Splitbit information content is "0" indicating that sub block 4 (later E4) of the block E will not be split further.

The bit number 18 of Splitbit information content is "1" indicating that the block F will be split to sub blocks.

The bit number 19 of Splitbit information content is "1" indicating that the sub block F1 will be split to sub blocks.

The bit number 20 of Splitbit information content is "0" indicating that sub block 1 (later F11) of the sub block F1 will not be split further.

The bit number 21 of Splitbit information content is "0" indicating that sub block 2 (later F12) of the sub block F1 will not be split further.

The bit number 22 of Splitbit information content is "0" indicating that sub block 3 (later F13) of the sub block F1 will not be split further.

The bit number 23 of Splitbit information content is "0" indicating that sub block 4 (later F14) of the sub block F1 will not be split further.

The bit number 24 of Splitbit information content is "0" indicating that sub block F2 will not be split further.

The bit number 25 of Splitbit information content is "0" indicating that sub block F3 will not be split further.

and

The bit number 26 of Splitbit information content is "0" indicating that sub block F4 will not be split further.

Figure 5:
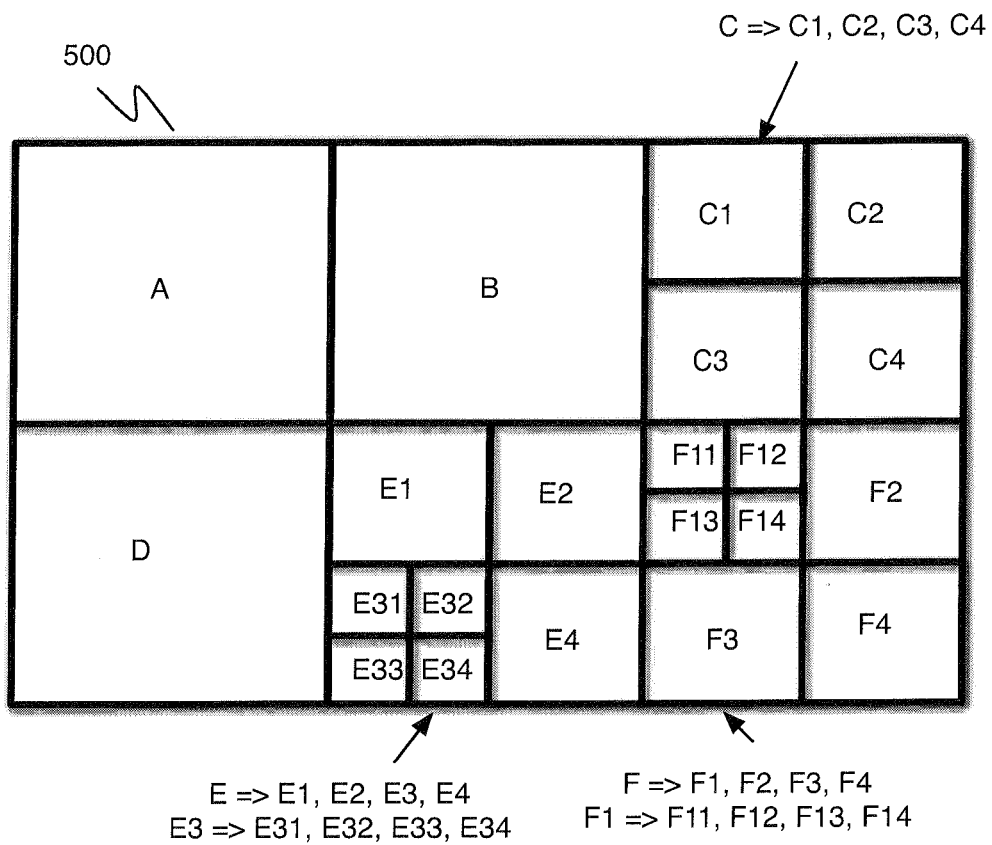
FIG. 5 is example of partitioning of image to be decoded using methods of embodiments.

Decoding Splitbit information results on "grid" of blocks over the image area 500 as shown in FIG. 5.

As third step Methodbits are used in decoding process. Information content is 0 0 1 0 0 0 0 0 0 0 0 0 0 0 0 0 0 0 0. The third bit of the Methodbits is "1" indicating that the third block in the grid should be applied with gradient function. The third block is block C1 of FIG. 5. All others should be applied with constant colour as defined in decoding rules of the embodiment.

In fourth step Value information is used in decoding process. Information content is 10 10 20 25 15 20 10 10 10 10 10 10 5 10 5 5 5 5 5 5 10 5 5 5.

The first value 10 indicates colour of first block A (blue). Said colour is applied to the block A.

The second value 10 indicates colour of second block B (blue). Said colour is applied to the block B.

For the third block method is "gradient" the values 20, 25, 15 and 20 indicate color of each corner of block C1 i.e. Red with 20 to top left corner, 25 to top right corner, 15 to bottom left corner and 20 to bottom right corner. Gradient fill to entire block is applied using said starting values for each corner of the block C1.

Figure 6:
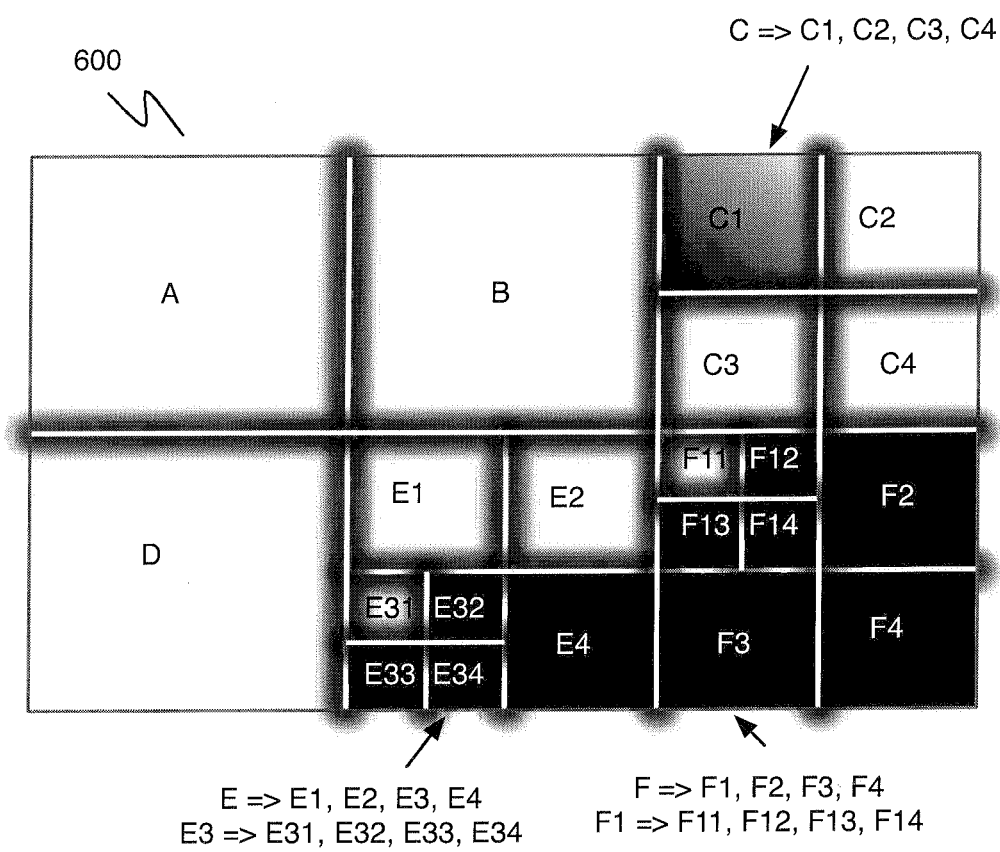
FIG. 6 is example decoded image.

For the fourth block (C2) colour value of 10 is applied etc. Each block is filled with respective colour. Resulting image 600 is shown in FIG. 6. Grid of blocks is shown in the figure for clarity purposes. In actual figure to be displayed for user the grid is not shown.

Algorithm can also include database for storing "common" combinations of block structures and colours. According to embodiment since block group E31, E32, E33 and E34 and block group F11, F12, F13 and F14 have same colour values combination and order (10, 5, 5, 5) it can be considered as one element and designed with own value (referred as Combination Value). Said combination value can be stored in a database (of encoder or decoder) and called with Reference Identification number when needed.

DEVICE EXAMPLE

Figure 7:
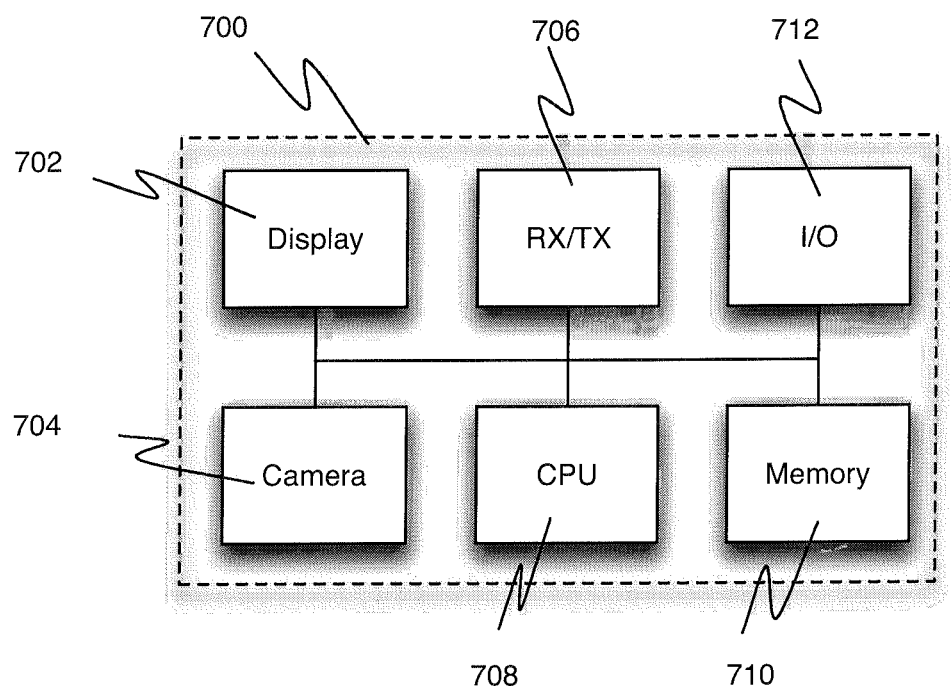
FIG. 7 is an example device in which decoding method can be executed.

In one embodiment the decoding can be implemented in portable device 700 of FIG. 7 such as smart phone or digital camera or video camera. Portable device 700 can consist of camera 704 for capturing a image, display for showing a image, receiver transmitter (RX/TX) 706 to enable communication using cellular networks or local area networks, other Input/Ouput (I/O) 712 such as Universal Serial Bus (USB) or Ethernet, Central Processing Unit (CPU) 708 for executing decoding (and encoding) related algorithms and instructions and memory 710 for storing image from camera, software for the decoding of encoded image content. The portable device 700 can be configured to store encoded images in local memory 710 or it can be configured to ask periodically, upon request, upon user action or in real time or close to real time encoded images via RX/TX 606 or via I/O 612 from external systems.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. A method of decoding encoded input data to generate corresponding decoded output data, comprising the steps of:
   (a) processing the encoded input data to extract therefrom header information indicative of encoded data pertaining to individual blocks and/or packets included in the encoded input data, said header information including data indicative of transformations employed to encode and compress original block and/or packet data for inclusion as the encoded data pertaining to the individual blocks and/or packets;
   (b) creating an initial set of individual blocks and/or packets based on received decoded header data, and preparing a data field in a data storage arrangement for decoded individual block and/or packet content;
   (c) splitting or combining individual blocks and/or packets in the data field according to splitting/combining information, as bits, a bit corresponding to specific individual block, packet, sub-block, or sub-packet data included in the encoded input data, specific ones of the individual blocks and/or packets being recursively split or combined a plurality of times in accordance with the splitting/combining information, the splitting/combining information being indicative as to whether the individual blocks and/or packets should be split or combined further during recursion;
   (d) retrieving information describing the transformations and then applying an inverse of the one or more transformations for decoding the encoded and compressed original block and/or packet data to generate corresponding decoded individual block and/or packet content for populating said data field; and
   (e) when the encoded input data has been at least partially decoded, outputting data from the data field as the decoded output data.

2. The method as claimed in claim 1, wherein the method includes decoding blocks and/or packets corresponding to a temporal series of images, wherein subdivision of the blocks of a given image in the series is dependent upon content present in one or more images preceding the given image within the temporal sequence of images.

3. The method as claimed in claim 1, wherein step (d) comprises fetching supplementary information from a database arrangement for use when executing said inverse of said transformations, said supplementary information including at least one of: algorithms, rules, one or more transformation parameters.

4. The method as claimed in claim 3, wherein the method further comprises retrieving header information from the encoded input data indicative of the database arrangement for enabling decoding of the encoded input data to access said supplementary information used when earlier encoding the input data.

5. The method as claimed in claim 1, wherein the method comprises employing for said inverse of the transformations inverses of at least one of: data base reference, DC-value, Discrete Cosine Transform (DCT), pulse code modulation (PCM), Differential Pulse Code Modulation (DPCM), Run-Length Encoding (RLE), Lempel-Ziv Obehumer (LZO), Variable Length Coding (VLC), Huffman-coding, arithmetic coding, transform coding, delta coding, and bzip2-specific RLE.

6. The method as claimed in claim 1, wherein the method further comprises decoding at least one of video and audio information present in the encoded input data.

7. A non-transitory computer readable storage medium comprising a set of computer readable instructions stored thereon, which when executed by a processing system causes the processing system to at least execute the method as claimed in claim 1.

8. A computer program product for a mobile wireless communication device stored on a non-transitory computer-readable storage medium, wherein the computer program product includes a non-transitory computer readable storage medium as claimed in claim 7.

9. A decoder operable to decode input data to generate corresponding decoded output data, wherein the decoder comprises data processing hardware which is operable:
(a) to process the encoded input data to extract therefrom header information indicative of encoded data pertaining to individual blocks and/or packets included in the encoded input data, said header information including data indicative of transformations employed to encode and compress original block and/or packet data for inclusion as the encoded data pertaining to the individual blocks and/or packets;
(b) to create an initial set of individual blocks and/or packets based on received decoded header data, and to prepare a data field in a data storage arrangement for decoded individual block and/or packet content;
(c) to split or combine individual blocks and/or packets in the data field according to splitting/combining information, as bits, a bit corresponding to specific individual block, packet, sub-block, or sub-packet data included in the encoded input data, specific ones of the individual blocks and/or packets being recursively split or combined a plurality of times in accordance with the splitting/combining information, the splitting/combining information being indicative as to whether individual blocks and/or packets should be split or combined further during recursion;
(d) to retrieve information describing the transformations and then applying an inverse of the transformations for decoding the encoded and compressed original block and/or packet data to generate corresponding decoded individual block and/or packet content for populating said data field; and
(e) when the encoded input data has been at least partially decoded, to output data from the data field as the decoded output data.

10. The decoder as claimed in claim 9, wherein the data processing hardware is implemented using computing hardware operable to execute a computer program product.

11. The decoder as claimed in claim 9, wherein the decoder is operable to use an inverse of the transformations to decompress content associated with the individual blocks and/or packets, so that the decoded output data is larger in size than the input data to be decoded.

12. The decoder as claimed in claim 9, wherein the blocks and/or packets are sub-divided so that at least one of their representative parameters describing their content is substantially flat within their sub-divided blocks or packets.

13. The decoder as claimed in claim 12, wherein the at least one parameter corresponds to a colour of the sub-divided blocks.

14. The decoder as claimed in claim 9, wherein the blocks and/or packets correspond to a series of images, wherein sub-division of the input data corresponding to a given image to form the plurality of corresponding blocks is dependent upon content present in one or more images preceding the given image within the temporal sequence of images.

15. The decoder as claimed in claim 9, wherein the decoder is operable to retrieve header information to the transformed data to generate the decoded output data, wherein said header information includes information indicative of said transformations employed by an encoder which generated the encoded input data.

16. The decoder as claimed in claim 9, wherein the decoder is operable to fetch supplementary information from a database arrangement for use when executing said inverse of transformations, said supplementary information including at least one of: algorithms, rules, and transformation parameters.

17. The decoder as claimed in claim 16, wherein the decoder is operable to retrieve header information to the encoded input data in a manner indicative of the database arrangement for enabling decoding of the encoded input data to access said supplementary information used when earlier encoding the encoded input data.

18. The decoder as claimed in claim 9, wherein the decoder is operable to employ for the inverse of the transformations inverses of at least one of: data base reference, DC-value, Discrete Cosine Transform (DCT), pulse code modulation (PCM), Differential Pulse Code Modulation (DPCM), Run-Length Encoding (RLE), Lempel-Ziv Obehumer (LZO), Variable Length Coding (VLC), Huffman-coding, arithmetic coding, transform coding, delta coding, and bzip2-specific RLE.

19. The decoder as claimed in claim 9, wherein the decoder is operable to decode at least one of video and audio information present in the encoded input data.

20. An electronic consumer product operable to receive and/or store encoded input data, wherein the electronic consumer product includes a decoder as claimed in claim 9 for decoding the input data for generating corresponding decoded content for providing to at least one user of the consumer product.

21. An electronic consumer product as claimed in claim 20, wherein the electronic consumer product is at least one of a mobile telephone, a cell phone, a tablet computer, a television, a portable media playing device, a camera, a personal computer.

22. The method as claimed in claim 1, wherein the splitting or combining individual blocks and/or packets in the data field according to splitting/combining information, as bits, is based upon quality of coding of input data during encoding.

23. The decoder as claimed in claim 9, wherein to split or combine individual blocks and/or packets in the data field according to splitting/combining information, as bits, is based upon quality of coding of input data during encoding.

* * * * *